(12) United States Patent
Haimoff (10) Patent No.: US 9,073,242 B2
(45) Date of Patent: Jul. 7, 2015

(54) METHOD AND APPARATUS OF INJECTION MOLDING

(75) Inventor: Efraim Haimoff, Mevazeret Zion (IL)

(73) Assignee: KETER PLASTIC LTD., Herzliya (IL)

( * ) Notice: Subject to any disclaimer, the term of this patent is extended or adjusted under 35 U.S.C. 154(b) by 325 days.

(21) Appl. No.: 13/394,384

(22) PCT Filed: Sep. 7, 2010

(86) PCT No.: PCT/IB2010/054027
§ 371 (c)(1),
(2), (4) Date: Jun. 4, 2012

(87) PCT Pub. No.: WO2011/030289
PCT Pub. Date: Mar. 17, 2011

(65) Prior Publication Data
US 2012/0228253 A1    Sep. 13, 2012

Related U.S. Application Data

(60) Provisional application No. 61/272,317, filed on Sep. 10, 2009.

(51) Int. Cl.
*B29C 45/12* (2006.01)
*B29C 45/00* (2006.01)
*B29C 45/16* (2006.01)

(52) U.S. Cl.
CPC ......... *B29C 45/0062* (2013.01); *B29C 45/1628* (2013.01); *B29C 2045/0072* (2013.01)

(58) Field of Classification Search
CPC .............. B29C 2045/0072; B29C 45/0062; B29C 45/1628; B29C 2045/1629–2045/1632; B29C 2045/0063
USPC .......................... 264/250; 425/588
See application file for complete search history.

(56) References Cited

U.S. PATENT DOCUMENTS

| | | | |
|---|---|---|---|
| 3,664,274 A | 5/1972 | Bustos | |
| 4,261,947 A | 4/1981 | Ogi | |
| 4,744,741 A | 5/1988 | Glover et al. | |
| 5,968,562 A | 10/1999 | Schad et al. | |
| 6,654,578 B2 * | 11/2003 | Suzuki et al. | 399/111 |
| 6,779,999 B2 | 8/2004 | Ciccone | |
| 7,081,179 B2 * | 7/2006 | Hartlmeier et al. | 156/245 |
| 7,241,413 B2 * | 7/2007 | Pfenniger et al. | 264/263 |
| 7,670,125 B2 * | 3/2010 | Armbruster | 425/123 |
| 8,113,820 B2 * | 2/2012 | Clark | 425/576 |
| 2003/0111765 A1 * | 6/2003 | Ichikawa et al. | 264/248 |
| 2004/0159298 A1 * | 8/2004 | Ino et al. | 123/184.21 |
| 2006/0088679 A1 * | 4/2006 | Nishida | 428/35.7 |
| 2006/0127526 A1 | 6/2006 | Gram | |
| 2006/0177540 A1 | 8/2006 | Lichtinger | |
| 2009/0256282 A1 | 10/2009 | Olaru et al. | |

OTHER PUBLICATIONS

International Search Report PCT/IB2010/054027 dated Feb. 11, 2011.

* cited by examiner

*Primary Examiner* — Jill Heitbrink
(74) *Attorney, Agent, or Firm* — Eitan, Mehulal & Sadot (57) ABSTRACT

A method for producing an article by injection molding, the method comprising molding a first type component of the article in a first mold plate of a first double-sided mold; substantially parallel to molding the first type component, molding a second type component of the article in a first mold plate of a second double-sided mold; substantially parallel to molding the first and the second type components, molding a welding seam bonding together a first type component positioned in a second mold plate of the first double-sided mold, and a second type component positioned in a second mold plate of the second double-sided mold.

16 Claims, 12 Drawing Sheets

FIG.5

METHOD AND APPARATUS OF INJECTION MOLDING

PRIOR APPLICATIONS DATA

This application is a National Phase application of PCT Application PCT/IB2010/054027, entitled "Injection-Molding Process and Article Manufactured Thereby", filed Sep. 7, 2010, which claims priority and benefit from U.S. Application 61/272,317, filed on Sep. 10, 2009, both of which are incorporated herein by reference in their entirety.

FIELD

Some embodiments relate to injection molding processes and articles manufactured thereby.

BACKGROUND

Injection molding is a well-known and widespread method, typically used for making articles from thermoplastic, resins and/or other plastic-related materials (hereinafter referred to as plastic). The molten plastic is generally injected at a relatively high pressure into a mold comprising the shape of the article, thus forming the article. Articles manufactured through injection molding are routinely encountered in daily life, such as for example, auto parts, housewares, storage systems, and furniture, among many others.

GLOSSARY

The term "parallel" may refer to, according to some embodiments, to processes being conducted or performed at least partially at the same time, concurrently, simultaneously, partially simultaneously, or during an overlapping or partially-overlapping or a common time slot. The term "parallel" may refer to, according to some embodiments, two processes that at one part of each process being conducted or performed simultaneously. For example, when a process of molding a first type component (such as component 113) is said to be performed parallel to a process of molding a second type component (such as component 112) of the article, this may mean, according to some embodiments, that two processes (molding a first type component and molding a second type component) may be performed at same time or at least a part of the first type component molding is performed at the same time as at least a part of the second type component molding.

SUMMARY

An aspect of some embodiments of the invention relates to providing a method for producing an article through an injection molding process, the method comprising molding components comprised in the article, and seam welding of the components to form the article, in a substantially same operation using parallel injection. The method provides for combining plastics, reinforced plastics, and/or metals, in the injection molding process, resulting in a relatively high strength, light weight article. The method further provides for mixing colors during the injection molding process. Implementation of the method reduces labor and quantities of raw materials, resulting in an improved article with lower production costs.

According to an aspect of some embodiments of the invention, the method comprises the use of double-sided molds wherein a first side and a second side of a mold are substantially the same, and wherein each mold is adapted to form a different component of the article. Optionally, more than one mold may form similar components of the article. A first side of a first mold comprising a component is brought together with a first side of a second mold comprising another component, or optionally, a similar component, and a plastic welding seam injected. The welding seam, which is adapted to bond the components together to form the article, is injected into recesses formed in edges of the components. Substantially in parallel with injection of the welding seam, the second side of the first mold and the second side of the second mold are injected with plastic, forming new components. The article is then removed and the component-comprising second side of the first mold is mated together with the component-comprising second side of the second mold. A welding seam is then injected to form a new article, while substantially in parallel, component-forming plastic is injected into the first side of the first mold, and into the first side of the second mold. The above procedure may be repeated according to production requirements.

In an embodiment of the invention, the double-sided mold comprises a rotating table adapted to rotate 180 degrees, two rotating tables disposed between a stationary table and a movable table. Each rotating table comprises two substantially identical female mold plates, one on each side, each mold plate comprising a shape of a component. The two rotating tables are further adapted to be moved so that a component-comprising first mold plate in a first table may be mated together with a component-comprising first mold plate in a second table, for welding seam injection.

The first rotating table is further adapted to move so that the second mold plate may mate together with a male mold plate comprised in the stationary table, and plastic may then be injected to form a component. Additionally, the second rotating table is further adapted to move so that the second mold plate may mate together with a male mold plate comprised in the movable table, and plastic may then be injected into the mold to form a component. Additionally or alternatively, the movable table may move to mate together with the second mold plate of the second table. Once the components are formed, the two rotating tables rotate 180 degrees so that the component-comprising second mold plate in the first rotating table may be mated with the component-comprising second mold plate in the second rotating table.

Plastic injection to form components is generally done in parallel with welding seam injection. Optionally, plastic injection may be done independently of welding seam injection, for example, as a first step in executing the method when a first article of a production batch is manufactured, or following a breakdown, or following maintenance operations, or following initial production start-up, or due to any other reason requiring initiating, or reinitiating, the injection molding process.

In some embodiments of the invention, the method may comprise the use of more than two rotating tables, for example, 3, 4, 5 or 6 rotating tables. Optionally, more than one stationary table may be used, for example, 2 or 3 stationary tables. Optionally, more than one movable table may be used, for example, 2 or 3 movable tables. Optionally, the method may be adapted to produce a plurality of different articles, substantially in parallel.

In an embodiment of the invention, the article comprises a plastic shelf. The shelf comprises an upper shell and a lower shell, each shell formed by the injection molding process. The upper shell may be formed by mating the mold plate comprised in the stationary table with a mold plate comprised in the first rotating table, and the lower shell may be formed by mating the mold plate in the movable table with a mold plate comprised in the second rotating table. Optionally, the lower shell may be formed by mating the mold plate in the stationary table with the mold plate in the first rotating table, and the upper shell formed by mating the mold plate in the movable table with the mold plate in the second rotating table.

The shells are joined together to form the shelf by rotating the two rotating tables and mating together the molding plates comprising the upper shell and the lower shell. The plastic welding seam is then injected, occupying a recess formed by a union between the upper shell and the lower shell along the edges of the shells. The recess may comprise a circular cross-section. Optionally, the recess may comprise other shapes suitable for bonding the two shells, for example, a T-shape, or a Y-shape, or the like. The welding seam bonds the two shells together, substantially preventing the shells from being displaced relative to one another when subject to loads or forces, including shear forces, which would possibly otherwise displace the shells. This results in an improved, relatively lightweight shelf, suitable for greater spans (longer length), and adapted to withstand greater loads. In some embodiments of the invention, the lower shell may comprise supporting elements, for example, metal rods, adapted to structurally reinforce the shelf and allowing substantially greater loading of the shelf.

BRIEF DESCRIPTION OF FIGURES

Examples illustrative of embodiments of the invention are described below with reference to figures attached hereto. In the figures, identical structures, elements or parts that appear in more than one figure are generally labeled with a same numeral in all the figures in which they appear. Dimensions of components and features shown in the figures are generally chosen for convenience and clarity of presentation and are not necessarily shown to scale. The figures are listed below.

DETAILED DESCRIPTION

Figure 1:
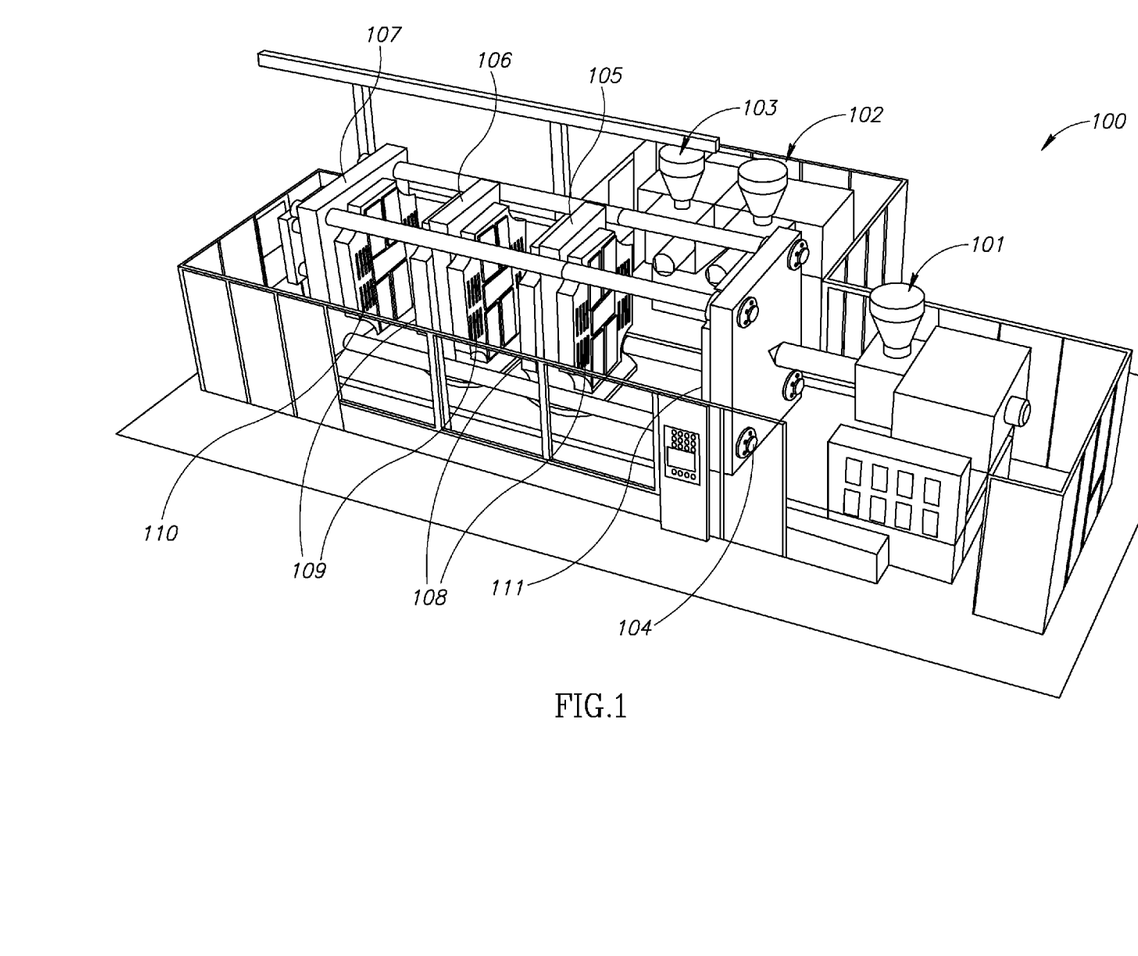
FIG. 1 schematically illustrates an exemplary injection molding production line, in accordance with an embodiment of the invention.
Figure 2A:
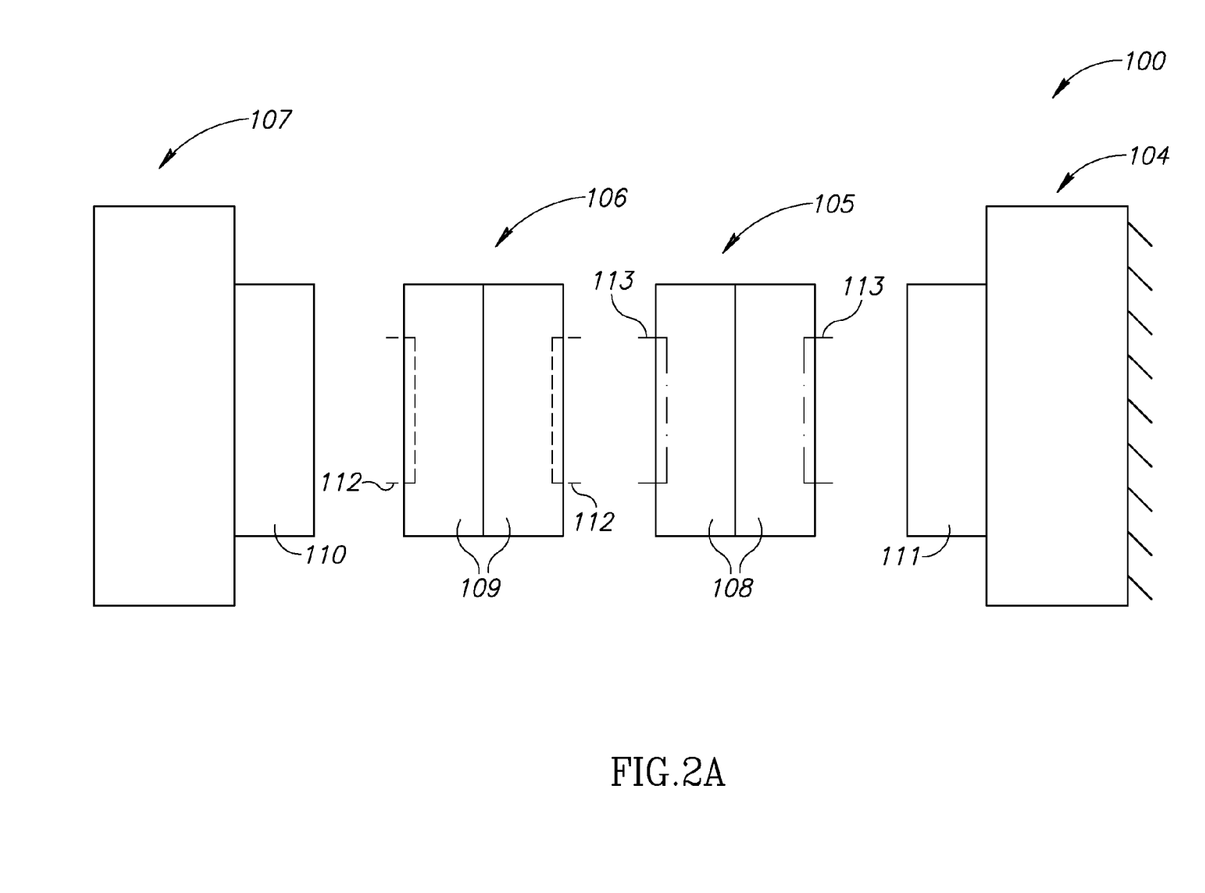
FIG. 2A schematically illustrates a plan view of exemplary table positions in the injection molding production line of FIG. 1, in a first stage of an injection molding process, in accordance with an embodiment of the invention.
Figure 2B:
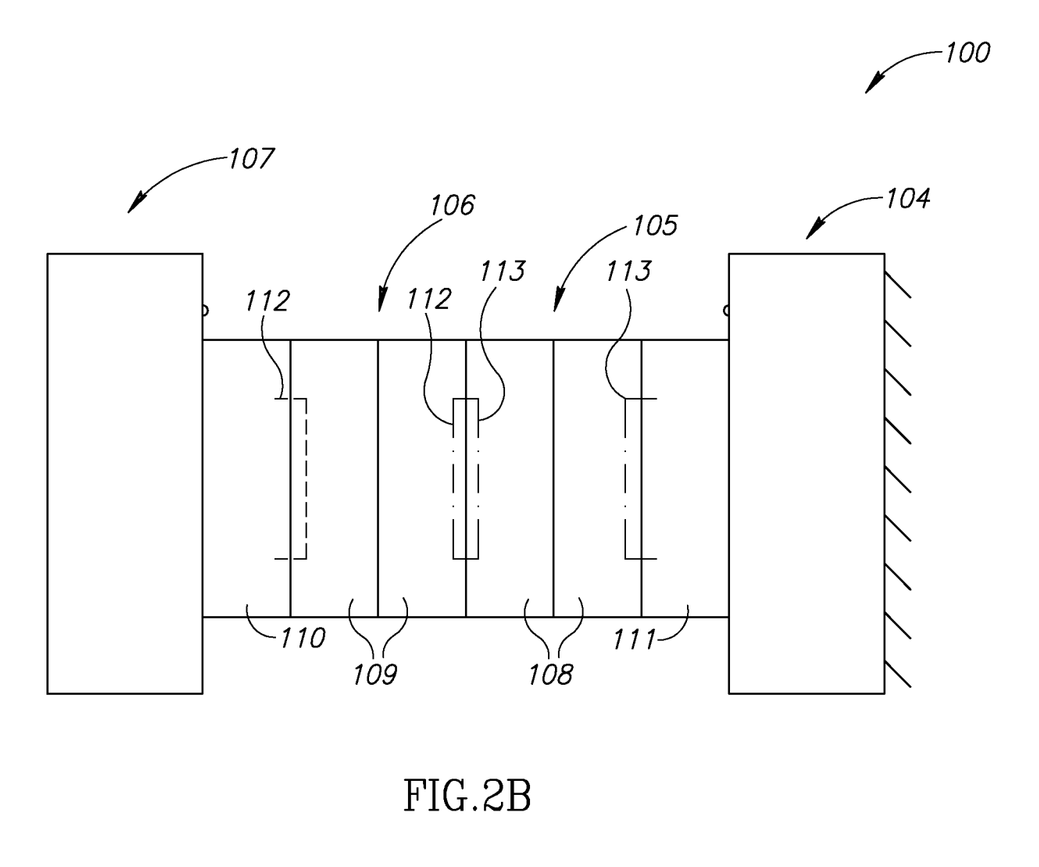
FIG. 2B schematically illustrates a plan view of exemplary table positions in the injection molding production line of FIG. 1, in a second stage of an injection molding process, in accordance with an embodiment of the invention.
Figure 2C:
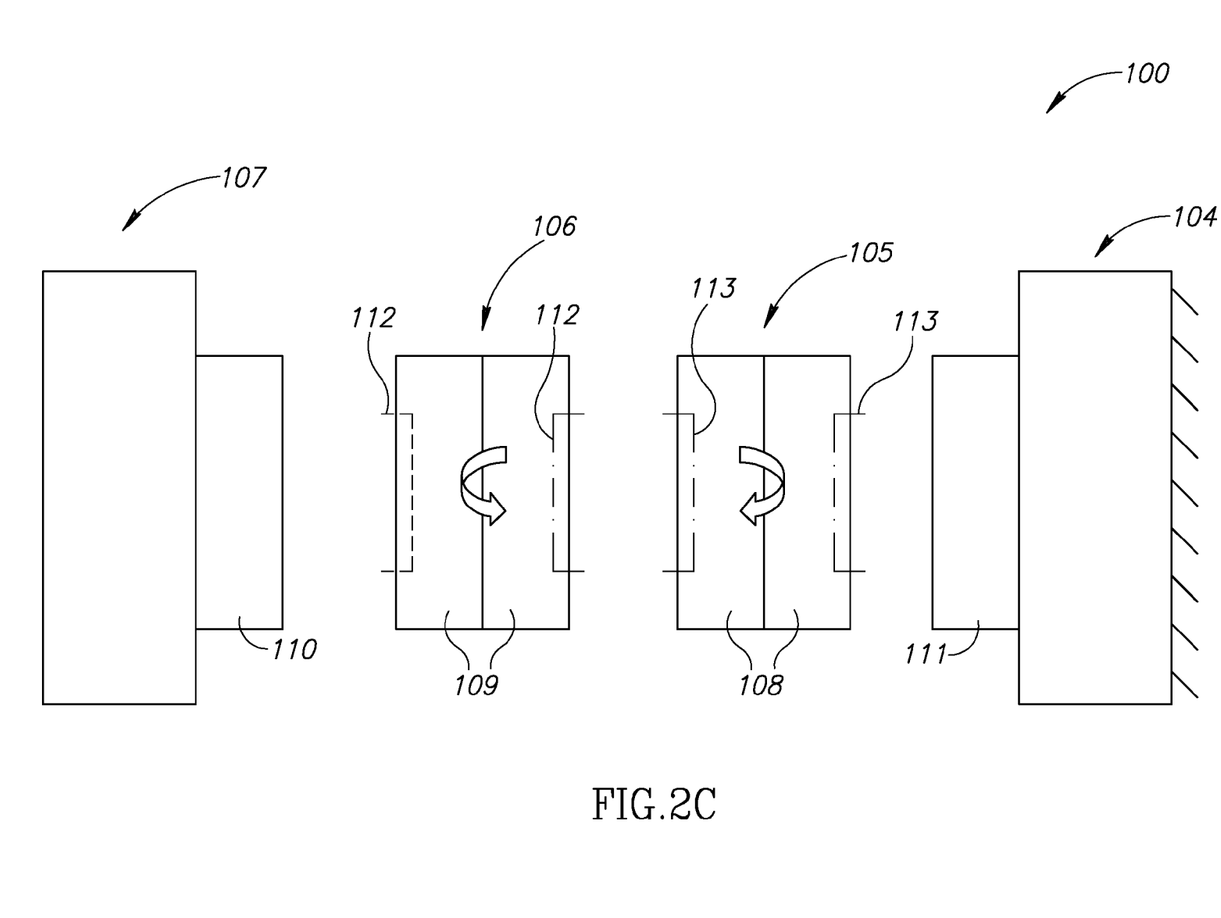
FIG. 2C schematically illustrates a plan view of exemplary table positions in the injection molding production line of FIG. 1, in a third stage of an injection molding process, in accordance with an embodiment of the invention.
Figure 2D:
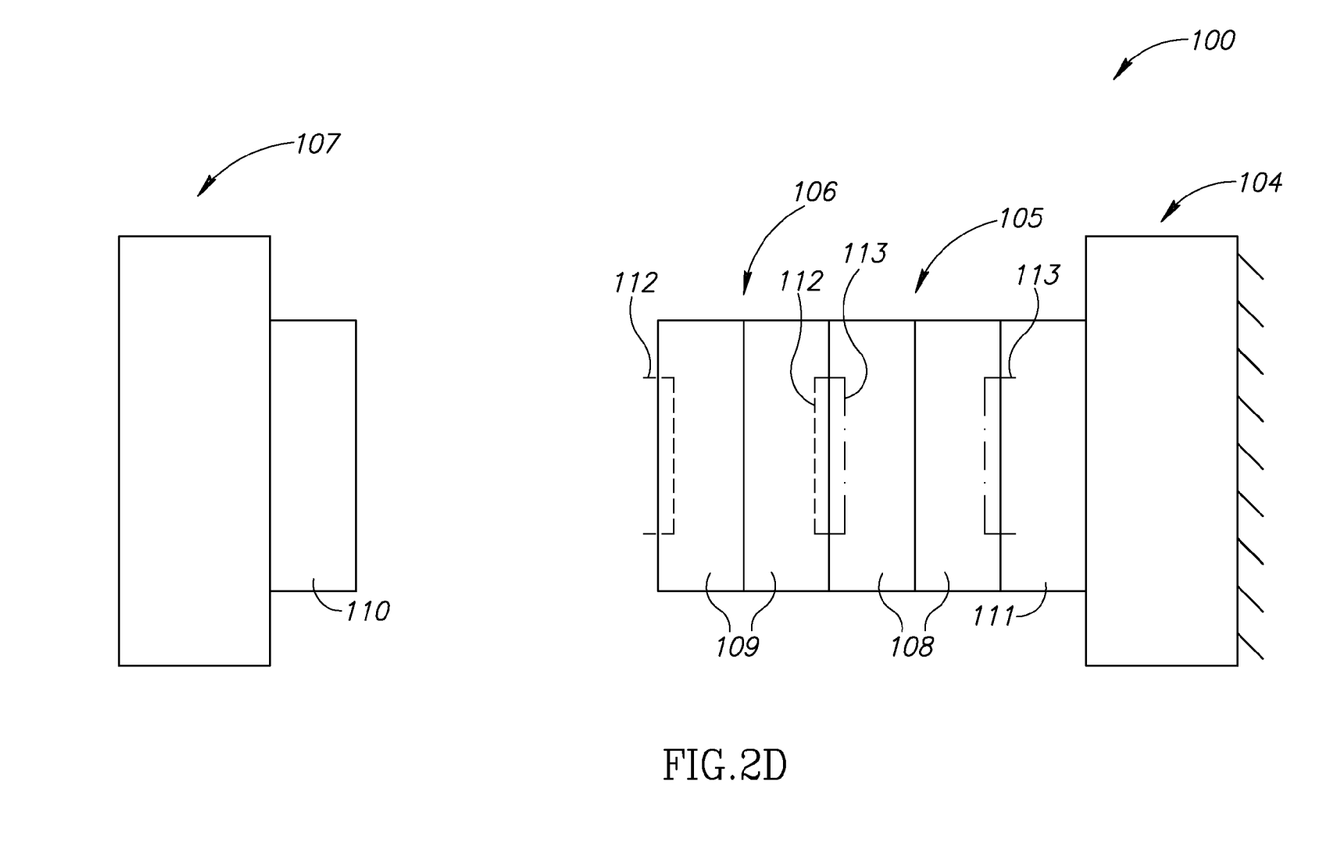
FIG. 2D schematically illustrates a plan view of exemplary table positions in the injection molding production line of FIG. 1, in a fourth stage of an injection molding process, in accordance with an embodiment of the invention.
Figure 2E:
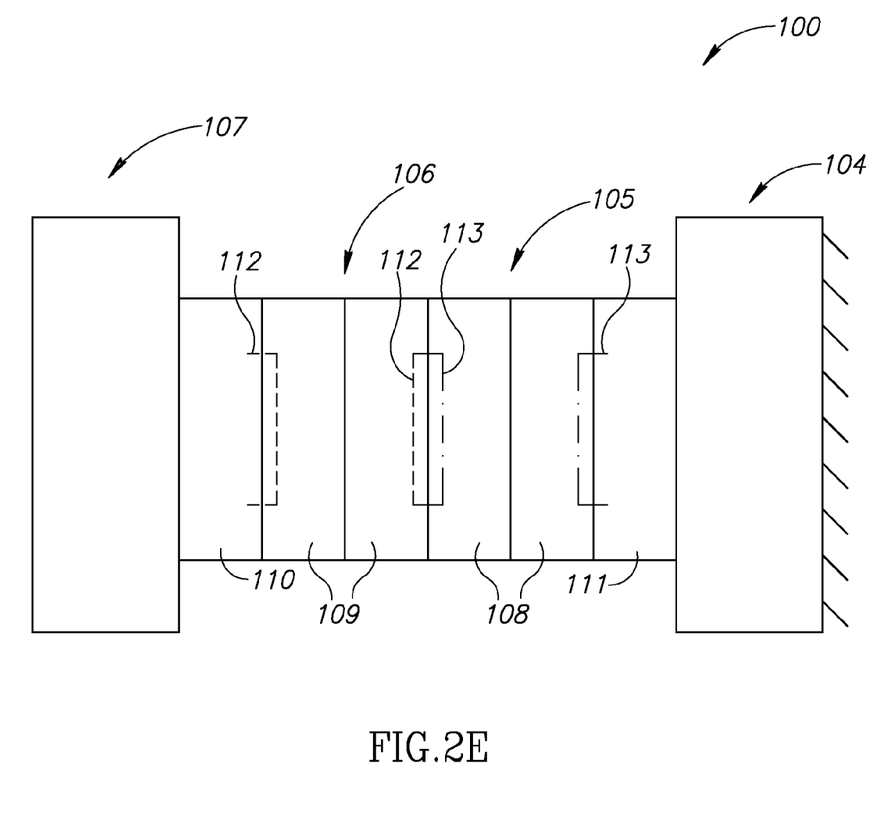
FIG. 2E schematically illustrates a plan view of exemplary table positions in the injection molding production line of FIG. 1, in a fifth stage of an injection molding process, in accordance with an embodiment of the invention.
Figure 2F:
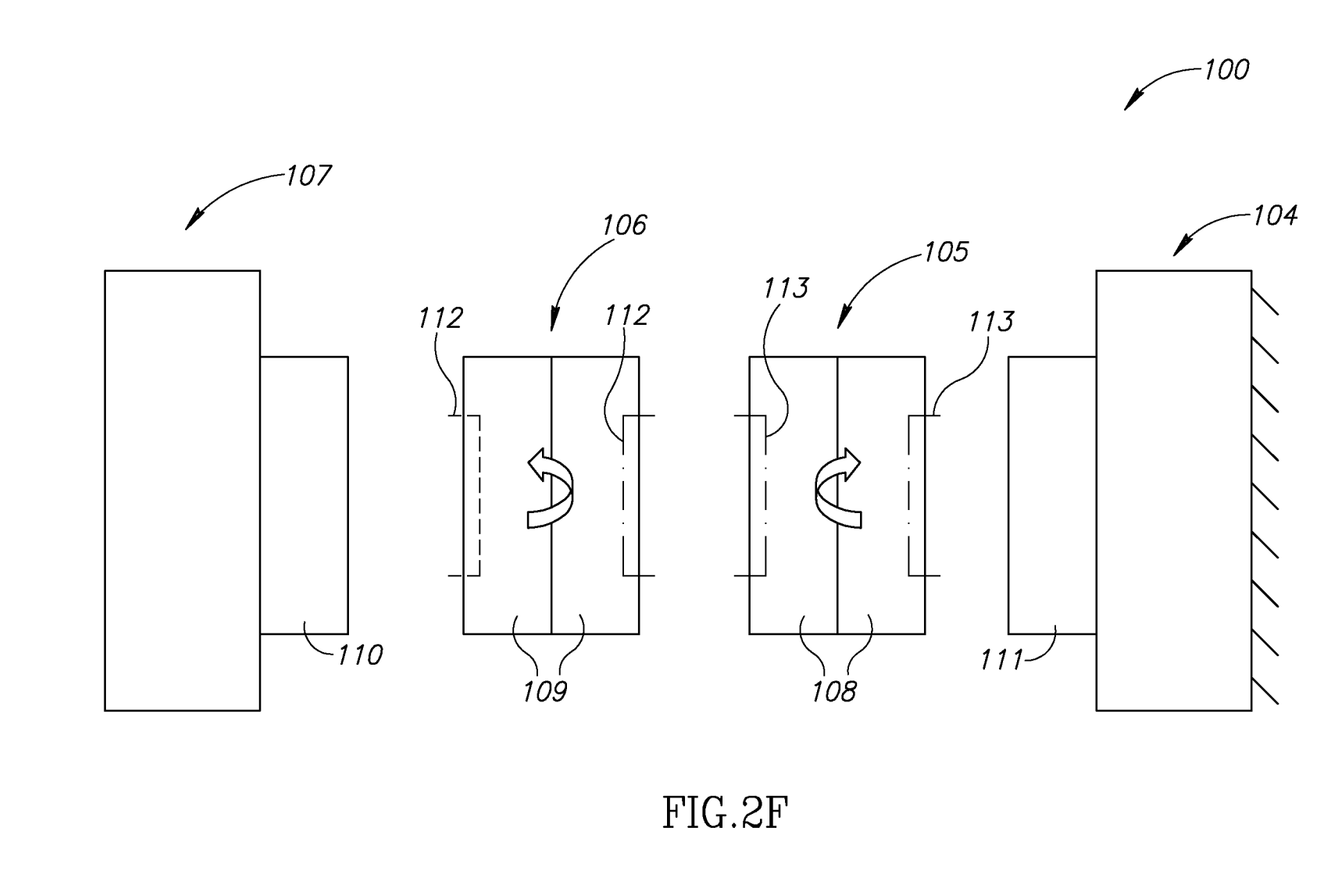
FIG. 2F schematically illustrates a plan view of exemplary table positions in the injection molding production line of FIG. 1, in a sixth stage of an injection molding process, in accordance with an embodiment of the invention.

Reference is made to FIG. 1 which schematically illustrates an exemplary injection molding production line 100 adapted to perform the method and produce an article thereby, in accordance with an embodiment of the invention. Production line 100 comprises a stationary table 104 including a male mold plate 111, a first rotating table 105 including first and second female mold plates 108, a second rotating table 106 including first and second female mold plates 109, and a movable table 107 including a male mold plate 110. Production line 100 further comprises a first plastic molding injector 101, a second plastic mold injector 102, and a third plastic mold injector 103.

First rotating 105 and second rotating table 106 are adapted to rotate 180 degrees, the rotating tables disposed between stationary table 104 and movable table 107. First and second female mold plates 108 in first rotating table 105 are substantially identical to one another, and comprise a shape of a first component comprised in the article. Additionally, first and second female mold plates 109 in second rotating table 106 are substantially identical to one another, and comprise a shape of a second component comprised in the article. Optionally, the first and second components may be substantially the same. Optionally, the first and second components may comprise mirror-image symmetry relative to one another. First rotating table 105 and second rotating table 106 are further adapted to be moved so that component-comprising first mold 108 plate in a first table 105 may be mated together with component-comprising first mold plate 109 in second table 106, for welding seam injection. Welding seam injection may be performed using injector 102.

First rotating table 105 is further adapted to move so that second mold plate 108 may mate together with male mold plate 111 comprised in stationary table 104. Once mated, plastic may be injected using injector 101 to form a first component. Second rotating table 106 is further adapted to move so that second mold plate 109 may mate together with male mold plate 110 comprised in movable table 107. Once mated, plastic may be injected using injector 103 to form a second component. Additionally or alternatively, movable table 107 may be adapted to move in order to mate male mold plate 110 together with second mold plate 109 comprised in second table 106.

Plastic injection with injectors 101 and 103 to form the components is generally done in parallel with welding seam injection with injector 102. Optionally, plastic injection with injectors 101 and 103 may be done independently of welding seam injection, for example, as a first step in executing the method when a first article of a production batch is manufactured, or following a breakdown, or following maintenance operations, or following initial production start-up, or due to any other reason requiring initiating, or reinitiating, the injection molding process.

In some embodiments of the invention, the method may comprise the use of more than two rotating tables, for example, 3, 4, 5 or 6 rotating tables. Optionally, more than one stationary table may be used, for example, 2 or 3 stationary tables. Optionally, more than one movable table may be used, for example, 2 or 3 movable tables. Optionally, a larger number of injectors may be used. Optionally, the method may be adapted to produce a plurality of different articles, substantially in parallel.

Reference is made to FIGS. 2A-2F which schematically illustrates a top view of exemplary positions of stationary table 104, first rotating table 105, second rotating table 106, and movable table 107, in injection molding production line 100 shown in FIG. 1, in various stages of the injection molding process, in accordance with an embodiment of the invention. Reference is also made to FIG. 1. First rotating table 105 and second rotating table 106 comprise female mold plates 108 and 109, respectively, mold plates 108 including the shape of the first component 113, and mold plates 109 including the shape of the second component 112.

Stage 1: Shown in FIG. 2A; the tables are positioned in an open position facing one another on production line 100, prior to start of production of the article.

Stage 2: Shown in FIG. 2B; first rotating table 105 is moved in order to mate first mold plate 108 with male mold plate 111 in stationary table 104. Second rotating table 106 is moved in order to mate second mold plate 109 with second mold plate 108 in rotating table 105. Movable table 107 is moved in order to mate male mold plate 110 with first mold plate 109 in second rotating table 106. Once all molding plates are mated, injector 101 and 103 inject plastic into first molds 108 and 109, to form components 113 and 112, respectively.

Stage 3: Shown in FIG. 2C; following molding of components 112 and 113, the tables return to the open position, and rotating tables 105 and 106 are rotated 180 degrees. Tables 105 and 106 comprise molded components 113 and 112 in first mold plates 108 and 109, respectively.

Stage 4: Shown in FIG. 2D; first rotating table 105 is moved in order to mate second mold plate 108 with male mold plate 111 in stationary table 104. Second rotating table 106 is moved in order to mate first mold plate 109 comprising component 112, with first mold plate 108 comprising component 113. Component 112 is aligned with component 113 for seam welding.

Stage 5: Shown in FIG. 2E; movable table 107 is moved in order to mate male mold plate 110 with second mold plate 109 in second rotating table 106. Once all molding plates are mated, injector 101 and 103 inject plastic into second molds 108 and 109, to form new components 113 and 112, respectively. Substantially in parallel with the injection from injectors 101 and 103, injector 102 injects plastic into first mold plates 108 and 109, forming the welding seam and bonding together components 112 and 113, forming the article.

Stage 6: Shown in FIG. 2E; following molding of new components 112 and 113 in second mold plates 109 and 108, respectively, and following bonding of components 112 and 113 in first mold plates 109 and 108, respectively, the tables return to the open position, and the article is removed. Rotating tables 105 and 106 are rotated 180 degrees. Tables 105 and 106 comprise molded components 113 and 112 in second mold plates 108 and 109, respectively.

Following Stage 6, stages 4-6 are repeated, with the component-comprising second mold plates now the first mold plates in the described stages. These stages are cyclically repeated according to the quantity of articles produced, alternating between first and second mold plates after every cycle.

Figure 3A:
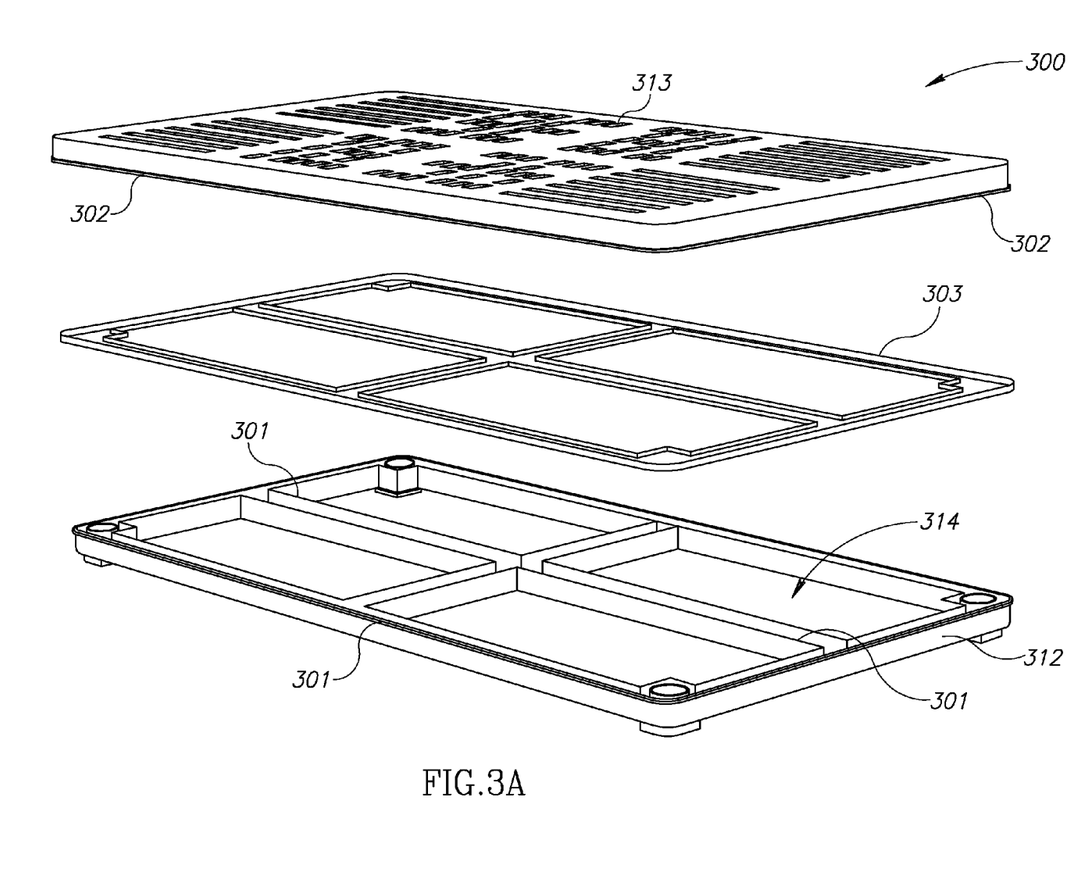
FIG. 3A schematically illustrates a perspective view of an exemplary shelf including its components, produced by the method, in accordance with an embodiment of the invention.
Figure 3B:
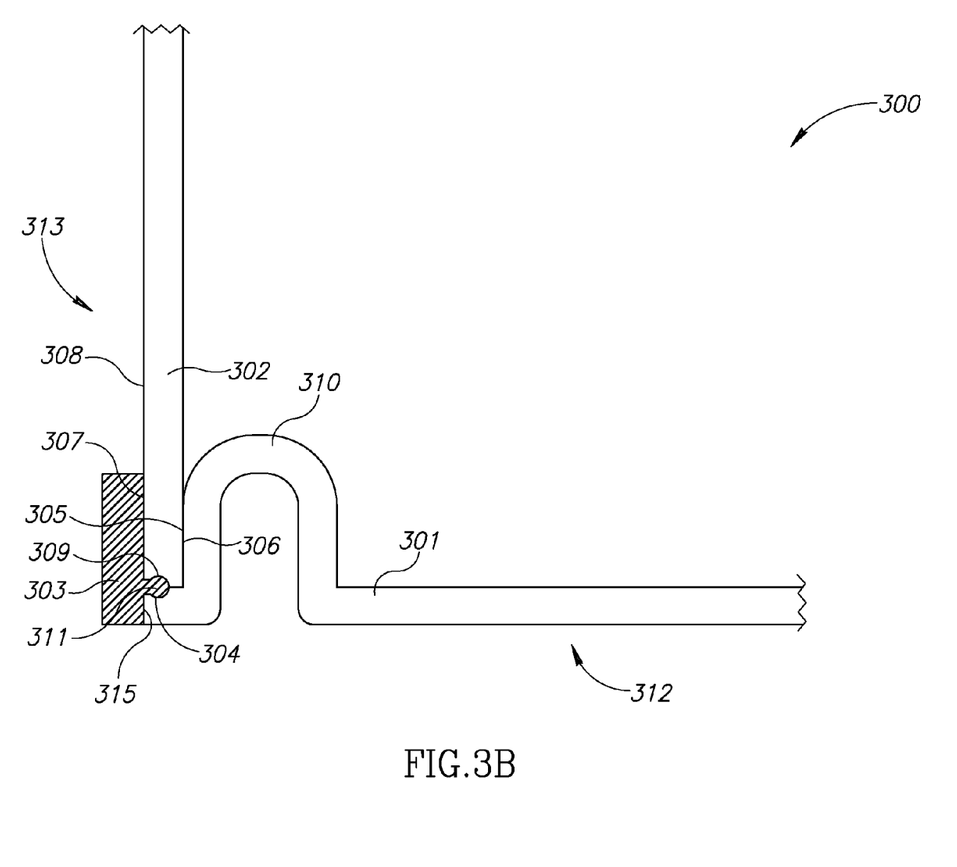
FIG. 3B schematically illustrates a sectional view of a bonding of the components of the shelf shown in FIG. 3A, in accordance with an embodiment of the invention.

Reference is made to FIG. 3A which schematically illustrates a perspective view of an exemplary article 300 produced by the method, in accordance with an embodiment of the invention. Article 300 comprises a shelf, hereinafter shelf 300, including an upper shell 313, a lower shell 312, and a seam 303. Reference is also made to FIG. 3B which schematically illustrates a sectional view of a method of bonding upper shell 313 with the lower shell 312 in FIG. 3A, in accordance with an embodiment of the invention. It should be clear to a person skilled in the art that the method of bonding shown in FIG. 3B is not limited to shelf 300, and is adapted be used by any article produced by the method described herein for the injection molding process. Examples of the articles may include doors, windows, tables, chairs, among many other items which may be produced by the injection molding process described.

Upper shell 313 and lower shell 312 may be the same or substantially similar to components 113 and 112 shown in FIGS. 1 and 2A-2F, respectively. Optionally, upper shell 313 and lower shell 312 may be the same or substantially similar to components 112 and 113, respectively. Upper shell 313 may be ventilated and may comprise a surface with holes and slots as shown, or may optionally comprise a solid surface without holes nor slots. Lower shell 312 may comprise openings 314, the openings adapted to reduce a quantity of plastic used in molding the lower shell.

Upper shell 313 and lower shell 312 are joined together to form shelf 300 by mating together the molding plates in the rotating tables comprising the upper shell and the lower shell. When mated together, a rim 302 in upper shell 313 forms a union with a rim 301 in lower shell 312, the rims located along the edges of the shells. Rim 301 comprises a protruding support 310, an outer wall 306 of the support adapted to abut with an inner wall 305 of rim 302.

Rim 302 and rim 301 further comprise curved edges 309 and 304, respectively, the edges adapted to form a recess 311 comprising a circular cross-section at the union of the rims. Plastic injected to form welding seam 303 forms a border along the union of rims 301 and 302, an inner surface 307 of the welding seam abutting with an outer surface 308 of rim 302, and an outer surface 315 of rim 301. In some embodiments of the invention, welding seam 303 may comprise an adhesive material adapted to adhere surface 307 to surfaces 308 and 315. The injected plastic additionally fills recess 311, the plastic filled recess adapted to lock welding seam 303 in place at the union between rims 301 and 302, bonding the shells together. Recess 311 may optionally comprise other shapes suitable for bonding the two shells, for example, a T-shape, or a Y-shape, or the like. Welding seam 303 bonds the upper shell 313 and lower shell 312 together, substantially preventing the shells from being displaced relative to one another when subject to loads or forces, including shear forces, which may, otherwise, displace the shells. This results in an improved, relatively lightweight, shelf 300, suitable for greater spans (longer length), and adapted to withstand greater loads. For example, shelf 300 may comprise dimensions of 18 inches×36 inches, optionally 24 inches×36, optionally 18 inches×48 inches.

Figure 4A:
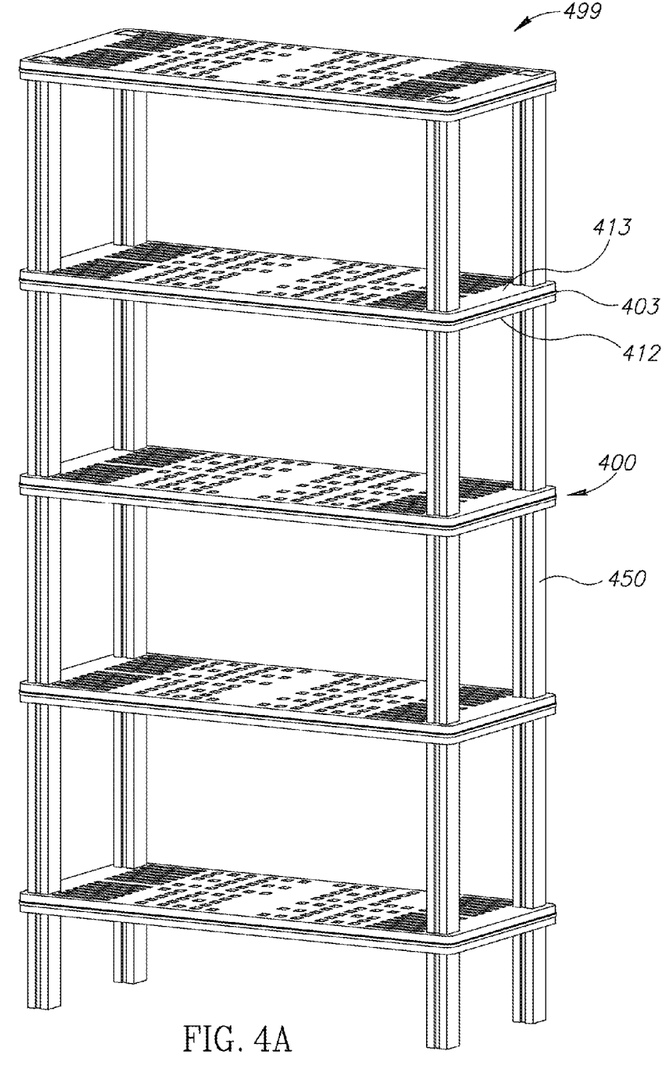
FIG. 4A schematically illustrates a perspective view of an exemplary shelf system, in accordance with an embodiment of the invention.
Figure 4B:
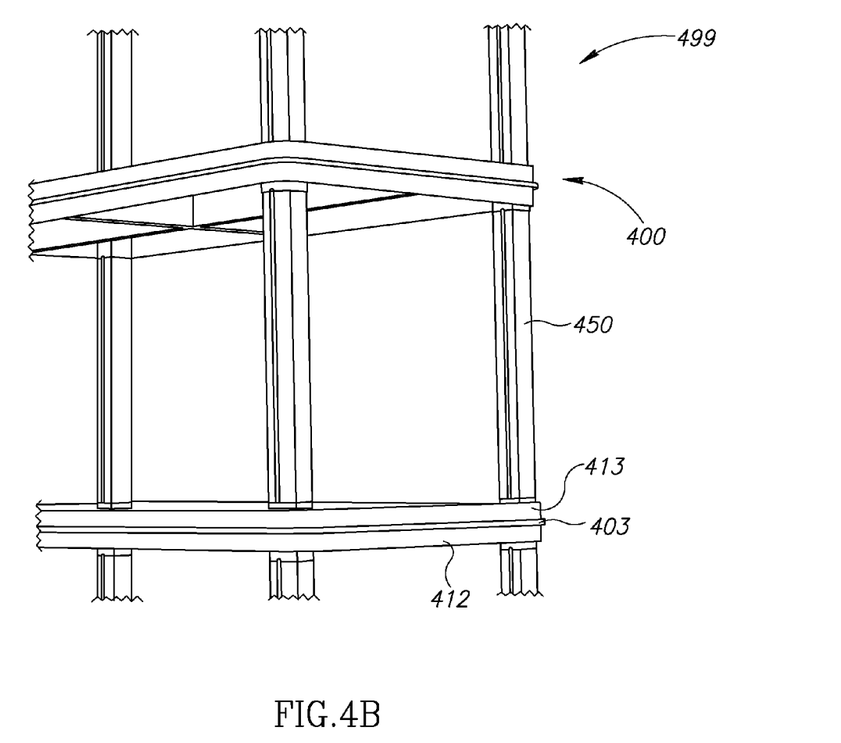
FIG. 4B schematically illustrates a perspective view of a section of the shelf system in FIG. 4A, in accordance with an embodiment of the invention.

Reference is made to FIG. 4A which schematically illustrates a perspective view of an exemplary shelf system 499, in accordance with an embodiment of the invention. Reference is also made to FIG. 4B which schematically illustrates a perspective close-up view of a section of the shelf system in FIG. 4A, in accordance with an embodiment of the invention.

Shelf system 499 comprises a plurality of plastic shelves 400, for example 5 shelves, and supporting vertical members 450 adapted to support the shelves when shelves are subject to maximum loading. Optionally, shelf system 499 may comprise 2, 3, 4, 6 or more shelves 400. Shelf 400 comprises an upper shell 413, a lower shell 412, and a welding seam 403. Shelf 400, including upper shell 412, lower shell 413, and seam 403, may be the same or substantially similar to that shown in FIGS. 3A and 3B at 300, 312, 313 and 303.

Figure 5:
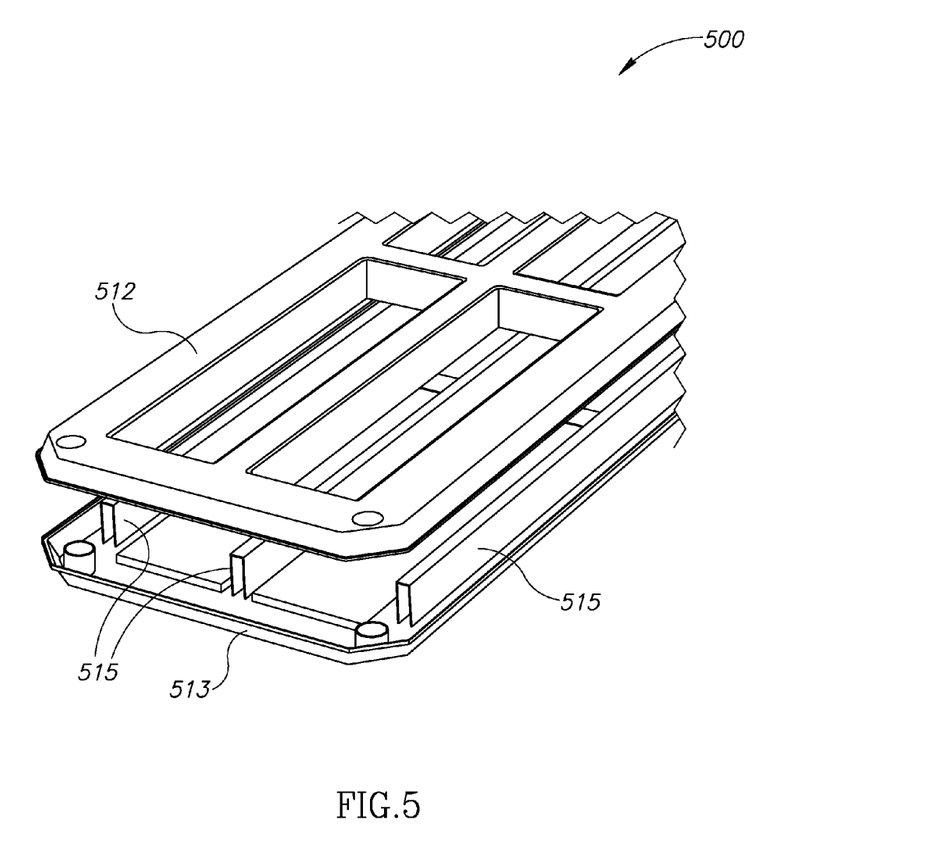
FIG. 5 schematically illustrates a perspective view of an exemplary disassembled structurally reinforced shelf, in accordance with another embodiment of the invention.

Reference is made to FIG. 5 which schematically illustrates a perspective view of a disassembled exemplary structurally reinforced shelf 500, in accordance with another embodiment of the invention. Reinforced shelf 500 comprises an upper shell 512, a lower shell 513, and a welding seam (not shown). Reinforced shelf 500 additionally comprises supporting elements 515, for example, metal rods, the supporting elements adapted to structurally reinforce the shelf, allowing substantially greater loading of the shelf and/or greater span. Shelf 500, including upper shelf 512, lower shelf 513, and the welding seam may be the same or substantially similar to that shown in FIGS. 3A and 3B at 300, 312, 313 and 303, additionally comprising the supporting elements 515.

In some embodiments of the invention, the lower shell may comprise supporting elements, for example, metal rods, adapted to structurally reinforce the shelf and allowing substantially greater loading of the shelf.

In the description and claims of embodiments of the present invention, each of the words, "comprise" "include" and "have", and forms thereof, are not necessarily limited to members in a list with which the words may be associated.

The invention has been described using various detailed descriptions of embodiments thereof that are provided by way of example and are not intended to limit the scope of the invention. The described embodiments may comprise different features, not all of which are required in all embodiments of the invention. Some embodiments of the invention utilize only some of the features or possible combinations of the features. Variations of embodiments of the invention that are described and embodiments of the invention comprising different combinations of features noted in the described embodiments will occur to persons with skill in the art.

The invention claimed is:

1. A method for producing an article by injection molding, the method comprising:
   (A) providing an injection molding production line (100), which comprises: (a) a stationary table (104) which includes a male mold plate (111); (b) a first rotating table (105) which includes first and second female mold plates (108); (c) a second rotating table (106) which includes first and second female mold plates (109); (d) a movable table (107) which includes a male mold plate (110); (e) a first plastic molding injector (101); (f) a second plastic molding injector (102); and (g) a third plastic molding injector (103);
   wherein the first rotating table (105) and the second rotating table (106) are adapted to rotate 180 degrees around a generally-vertical rotation axis, and are disposed between the stationary table (104) and the movable table (107);
   wherein the first and second female mold plates (108) in the first rotating table (105) are substantially identical to one another, and comprise a shape of a first component (113) comprised in the article;
   wherein the first and second female mold plates (109) in the second rotating table (106) are substantially identical to one another, and comprise a shape of a second component (112) comprised in the article;
   wherein the first and second components comprise mirror-image symmetry relative to one another;
   wherein the first rotating table (105) and the second rotating table (106) are adapted to be moved so that component-comprising first mold plate (108) in the first rotating table (105) mates together with component-comprising first mold plate (109) in the second rotating table (106);
   wherein the first rotating table (105) is adapted to move so that the second mold plate (108) mates together with male mold plate (111) comprised in the stationary table (104);
   wherein the second rotating table (106) is adapted to move so that the second mold plate (109) mates together with the male mold plate (110) comprised in the movable table (107);
   wherein the movable table (107) is adapted to move in order to the mate male mold plate (110) together with the second mold plate (109) comprised in the second rotating table (106);
   (B) positioning the tables (105, 106, 107, 108) in an open position facing one another on the production line (100);
   (C) moving the first rotating table (105) in order to mate the first mold plate (108) with the male mold plate (111) in stationary table (104);
   (D) moving the second rotating table (106) in order to mate the second mold plate (109) with the second mold plate (108) in the rotating table (105);
   (E) moving the movable table (107) in order to mate the male mold plate (110) with the first mold plate (109) in the second rotating table (106);
   (F) injecting plastic from the first plastic molding injector (101) into first mold (108) to form the first component (113);
   (G) injecting plastic from the third plastic molding injector (103) into first mold (109) to form the second component (112);
   (H) returning the tables (105, 106, 107, 108) to an open position;
   (I) rotating by 180 degrees, around said generally-vertical injection axis, the first rotating table (105), which comprises the first component (113) in the first mold plate (108);
   (J) rotating by 180 degrees, around said generally-vertical injection axis, the second rotating table (106), which comprises the second component (112) in the first mold plate (109);
   (K) moving the first rotating table (105) in order to mate the second mold plate (108) with the male mold plate (111) in the stationary table (104);
   (L) moving the second rotating table (106) in order to mate (a) the first mold plate (109) which comprises the second component (112), with (b) the first mold plate (108) which comprises the first component (113);
   (M) moving the movable table (107) in order to mate the male mold plate (110) with the second mold plate (109) in the second rotating table (106);
   (N) injecting plastic from the first plastic molding injector (101) into the first mold (108) to form a new first component (113);
   (O) injecting plastic from the third plastic molding injector (103) into the first mold (109) to form a new second component (112);
   (P) injecting plastic from the second plastic molding injector (102) into the first mold plates (108, 109) to form a welding seam that is structured as a rectangular welding seam frame containing therein a cross-shaped welding seam, thereby bonding together the first and second components (112, 113) and forming the article.

2. The method of claim 1, wherein the first component and the second component are substantially the same.

3. The method of claim 1, further comprising:
molding the welding seam into a recess formed at a border of a union of the first component and the second component.

4. The method of claim 3, wherein the recess comprises a circular cross-section.

5. The method of claim 3, wherein the recess comprises a T-shaped cross-section.

6. The method of claim 3, wherein the recess comprises a Y-shaped cross-section.

7. The method of claim 1, further comprising:
adhering the welding seam to the first component and/or the second component.

8. The method of claim 1, wherein the first rotating table (105) is implemented as a generally plate-shaped component; and wherein the second rotating table (106) is implemented as a generally plate-shaped component.

9. An apparatus for producing an article by injection molding, the apparatus comprising:
(A) an injection molding production line (100), which comprises: (a) a stationary table (104) which includes a male mold plate (111); (b) a first rotating table (105) which includes first and second female mold plates (108); (c) a second rotating table (106) which includes first and second female mold plates (109); (d) a movable table (107) which includes a male mold plate (110); (e) a first plastic molding injector (101); (f) a second plastic molding injector (102); and (g) a third plastic molding injector (103);
wherein the first rotating table (105) and the second rotating table (106) are adapted to rotate 180 degrees around a generally-vertical rotation axis, and are disposed between the stationary table (104) and the movable table (107);
wherein the first and second female mold plates (108) in the first rotating table (105) are substantially identical to one another, and comprise a shape of a first component (113) comprised in the article;
wherein the first and second female mold plates (109) in the second rotating table (106) are substantially identical to one another, and comprise a shape of a second component (112) comprised in the article;
wherein the first and second components comprise mirror-image symmetry relative to one another;
wherein the first rotating table (105) and the second rotating table (106) are adapted to be moved so that component-comprising first mold plate (108) in the first rotating table (105) mates together with component-comprising first mold plate (109) in the second rotating table (106);
wherein the first rotating table (105) is adapted to move so that the second mold plate (108) mates together with male mold plate (111) comprised in the stationary table (104);
wherein the second rotating table (106) is adapted to move so that the second mold plate (109) mates together with the male mold plate (110) comprised in the movable table (107);
wherein the movable table (107) is adapted to move in order to the mate male mold plate (110) together with the second mold plate (109) comprised in the second rotating table (106);
wherein the injection molding production line (100) is to perform the following steps:

(B) positioning the tables (105, 106, 107, 108) in an open position facing one another on the production line (100);
(C) moving the first rotating table (105) in order to mate the first mold plate (108) with the male mold plate (111) in stationary table (104);
(D) moving the second rotating table (106) in order to mate the second mold plate (109) with the second mold plate (108) in the rotating table (105);
(E) moving the movable table (107) in order to mate the male mold plate (110) with the first mold plate (109) in the second rotating table (106);
(F) injecting plastic from the first plastic molding injector (101) into first mold (108) to form the first component (113);
(G) injecting plastic from the third plastic molding injector (103) into first mold (109) to form the second component (112);
(H) returning the tables (105, 106, 107, 108) to an open position;
(I) rotating by 180 degrees, around said generally-vertical injection axis, the first rotating table (105), which comprises the first component (113) in the first mold plate (108);
(J) rotating by 180 degrees, around said generally-vertical injection axis, the second rotating table (106), which comprises the second component (112) in the first mold plate (109);
(K) moving the first rotating table (105) in order to mate the second mold plate (108) with the male mold plate (111) in the stationary table (104);
(L) moving the second rotating table (106) in order to mate (a) the first mold plate (109) which comprises the second component (112), with (b) the first mold plate (108) which comprises the first component (113);
(M) moving the movable table (107) in order to mate the male mold plate (110) with the second mold plate (109) in the second rotating table (106);
(N) injecting plastic from the first plastic molding injector (101) into the first mold (108) to form a new first component (113);
(O) injecting plastic from the third plastic molding injector (103) into the first mold (109) to form a new second component (112);
(P) injecting plastic from the second plastic molding injector (102) into the first mold plates (108, 109) to form a welding seam that is structured as a rectangular welding seam frame containing therein a cross-shaped welding seam, thereby bonding together the first and second components (112, 113) and forming the article.

10. The apparatus of claim 9, wherein the first component and the second component are substantially the same.

11. The apparatus of claim 9, wherein the welding seam is molded into a recess formed at a border of a union of the first component and the second component.

12. The apparatus of claim 11, wherein the recess comprises a circular cross-section.

13. The apparatus of claim 11, wherein the recess comprises a T-shaped cross-section.

14. The apparatus of claim 11, wherein the recess comprises a Y-shaped cross-section.

15. The apparatus of claim 9, wherein the welding seam comprises an adhesive.

16. The apparatus of claim 9, wherein the first rotating table (105) is implemented as a generally plate-shaped component; and wherein the second rotating table (106) is implemented as a generally plate-shaped component.

* * * * *